April 20, 1937.   G. W. HEISE   2,077,561
BATTERY CELL
Filed March 31, 1933
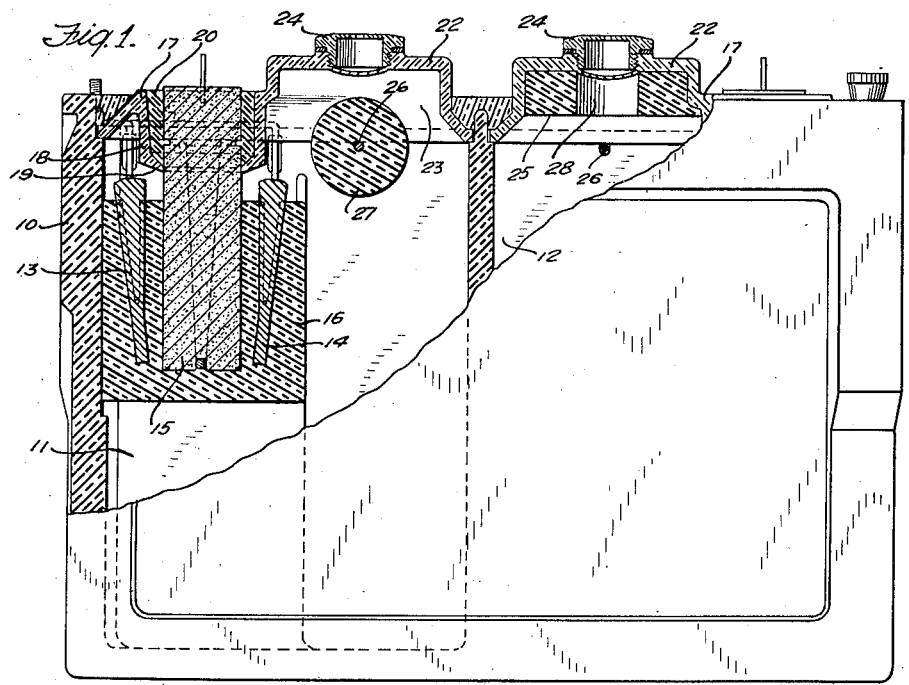
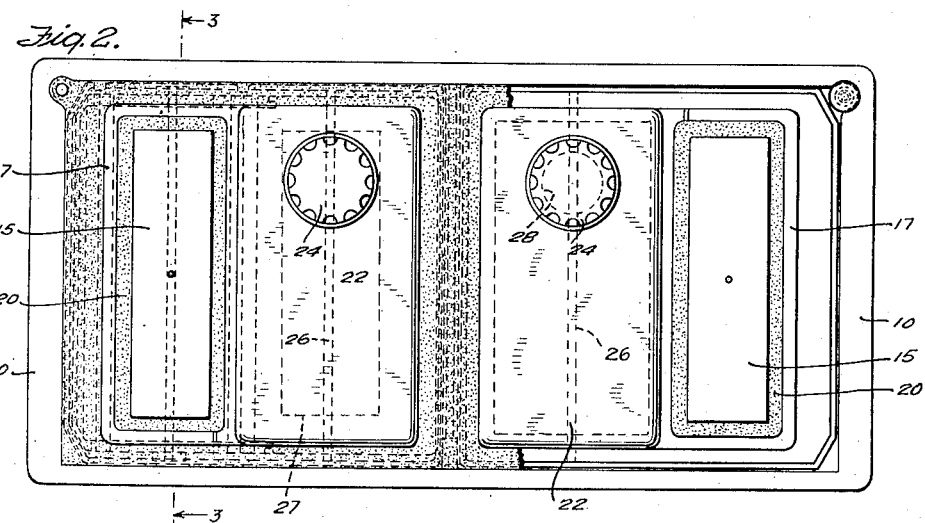
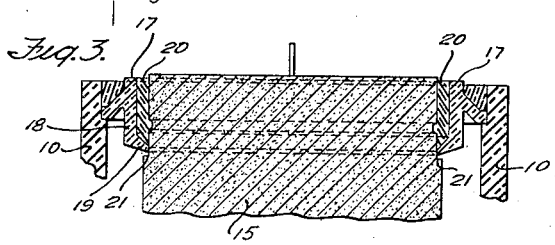
INVENTOR
GEORGE W. HEISE
BY
ATTORNEY Patented Apr. 20, 1937

2,077,561

UNITED STATES PATENT OFFICE 2,077,561

BATTERY CELL

George W. Heise, North Olmsted, Ohio, assignor, by mesne assignments, to Union Carbide and Carbon Corporation, a corporation of New York Application March 31, 1933, Serial No. 663,697

12 Claims. (Cl. 136—112)

The invention pertains in general to battery cells, such as water-activated deferred-action cells, and in particular to improvements in air-depolarized deferred-action cells, such as those disclosed in my patent application Serial No. 374,519, (now Patent No. 1,972,775, granted September 4, 1934) and also in the patent applications of Dario Domizi, Serial No. 508,788 (now Patent No. 2,051,987, granted August 25, 1936) and Serial No. 648,334 (now Patent No. 2,061,899, granted November 24, 1936).

In cells of this type the solid electrolyte material and the water required for activation occupy a volume far in excess of that of the final solution. Heretofore it has been customary to activate such batteries by the addition of water in two installments, first completely filling the battery container, then waiting a period of hours until the level has fallen sufficiently to permit the remainder to be added. This procedure is undesirable because it unduly defers the time when the battery is ready for service and because it necessitates detailed instructions which an inexperienced user is likely to disregard or misinterpret with injury to the battery.

The obvious expedient of increasing the height of the battery to permit addition of all the water required at one time is not an adequate solution of the problem as this expedient would increase the size and cost of the carbon electrode to an undesirable extent and also unduly increase the distance which oxygen must travel from the outside air to the active electrode surface of the electrode, thus reducing the maximum safe current drain of the cell. Therefore, one object of this invention is to provide a battery of this type in which all of the water required for activation may be added at a single filling without increasing the distance from the outer air to the active surface of the electrode.

An example of means for attaining the above object comprises raising only a portion of the battery cover to provide a chamber having sufficient space to hold the excess water previously added in a second installment, without changing the position of the carbon electrode. The size of the chamber in the raised portion depends upon the size of the battery and its structural features, and hence cannot be defined with exactness. The particular cells disclosed however, have an electrolyte volume of about 3.5 liters and the volume of the additional space provided is approximately 175 cc.

After cells of this type having a raised cover are activated there is a considerable volume of water above and not in intimate contact with the active electrolyte ingredient in the cell whether loose or cast about the electrode assembly. The result is a non-uniform electrolyte solution very much diluted toward the top which may penetrate the carbon electrode to a detrimental extent, and also as is well understood in battery practice, cause accelerated and uneven corrosion of the zinc anode through the formation of "concentration cells". Therefore, another object is to provide such cells with means for increasing the uniformity of concentration of the electrolyte solution in the activated battery.

Structure and production methods make it impractical to raise the main body of electrolyte ingredient sufficiently to counteract this evil. I have found, however, that a small auxiliary portion of electrolyte ingredient placed above the main body and comprising perhaps one-fifth to one-fourth of the total required in the battery will greatly increase the concentration of the electrolyte in the upper layers. Preferably, this auxiliary ingredient comprises caustic soda or other well known active material cast around a support such as the rod or wire provided for indicating the proper level of the electrolyte solution but it may, however, be cast directly in the raised portion of the cover without obstructing the filler opening, or otherwise supported in any convenient manner when in granular form.

The uniformity of concentration of the electrolyte may vary under different conditions such as the temperature of activation and the size, position and composition of the auxiliary caustic, but the general character of the improvement is shown by the following typical examples. In batteries of this type not provided with auxiliary caustic the concentration of the electrolyte solution was approximately 50 grams of NaOH per liter one-half inch below the upper surface twenty-four hours after activation, while normal concentration is about 230 grams per liter. In similar cells provided with auxiliary caustic cast around the indicator wire the concentration was approximately 110 grams per liter, while in other similar cells with the auxiliary caustic cast directly in the cover the concentration was 135 grams per liter.

The auxiliary caustic may be of the same ratio of NaOH to water as the main body of caustic, but as the speed of solution is an important factor some additional increase in concentration of the electrolyte at the top of the solution may be obtained by using an auxiliary cast of caustic having a higher NaOH to water ratio and therefore a slower solution rate than the main body of caustic. In this case the higher melting point of the more concentrated caustic is not a disadvantage although it would be for the main casting since excessive heating of the carbon during casting of the caustic or subsequent battery activation should be avoided.

When a battery of this type is used at elevated temperature or is activated with warm water the plastic seal which encloses the carbon electrode and holds it in place may soften. Consequently, the electrode which is quite buoyant in the electrolyte solution then proceeds to rise slowly through the plastic seal thus impairing the operating quality of the battery and incurring the danger of destructive internal short circuit. This difficulty is increased in the improved construction shown herein because of the increased hydrostatic pressure and correspondingly greater upward thrust of the electrode. Therefore, I have provided a battery of this type in which the carbon electrode or cathode will not be displaced when the supporting seal becomes softened by heat.

This is attained by providing the battery with a carbon electrode having a portion below the supporting cell cover that is larger than the opening in the cover in which the upper portion of the electrode is supported.

These and other objects and novel features of the invention will be apparent from the following specification and the accompanying illustration in which:

Fig. 1 is a side view of a two-cell battery having a portion of the side wall broken away to show the invention;

Fig. 2 is a top view of the battery shown in Fig. 1; and

Fig. 3 is a sectional view along line 3—3 of Fig. 2, showing the structure of the upper end of the carbon electrode and its relation to the cell cover.

An example of the application of my invention as embodied in the battery shown in the drawing comprises a battery casing 10 provided with main chambers or compartments 11 and 12 for identical battery cells. Each cell is provided with two zinc electrodes 13 and 14, a carbon electrode 15 and a main body or cast of solid hydrated caustic soda 16 around the electrodes below the normal solution level. This main body may be in another part of the cell and in other form such as granular.

Each of the cell compartments 11 and 12 is provided with a cover 17 having a depending wall or portion 18 with a constricted bottom 19 provided with an opening through which the carbon electrode 15 extends upward to the outer atmosphere. A filling of thermoplastic sealing material 20 between the inner surface of the depending wall 18 and the upper end of the carbon electrode 15 normally holds it in place.

In order to prevent the carbon electrode 15 from moving upward when the sealing material 20 has been softened by heat, the electrode is provided with a portion below the cover 17 that is larger than the opening in the cover in which the electrode is secured. Preferably, this enlargement comprises shoulders 21 on the respective edges of the electrode that rest against or are slightly below the constricted portion 19 of the cover 17. These shoulders may be of any suitable size although for convenience they extend downward the length of the electrode. In other words, the width of the upper end of the electrode that is supported by the cover is reduced or slightly narrower than the portion of the electrode below the cover.

In order to provide room for the water required to activate the battery a portion 22 of the cover 17 is raised upward to provide an auxiliary water chamber 23 above the normal solution level of the cell for the difference in volume of the solid caustic and water over that of the final solution and preferably the portion 22 forming the top of the water chamber 23 is provided with a filler opening having a cover 24.

The auxiliary caustic soda may be supported at or above the liquid level in any suitable way. For example, it may be cast directly in the raised portion 22 of cover 17 above the normal solution level of the cell as shown at 25 in the cover for cell compartment 12, or it may be cast around a support such as the level indicator wire 26 at least partially above the normal solution level as shown at 27 in cell compartment 11. When placed directly in the cover it should be cast around the filler opening or provided with an opening 28 through which the activating water may be added. When placed around the indicator wire 26 it is preferably cast in the form of a cylinder extending substantially the width of the battery. However, it may be cast in other forms in either case, or supported by other suitable means when in granular form.

As further examples of applications of the invention, the auxiliary water chamber and auxiliary caustic may be applied to other cells or batteries such as copper oxide cells or alkaline storage batteries. Also, the solid electrolyte material may comprise potassium hydroxide (KOH) as well as sodium hydroxide (NaOH) in cells having an alkaline electrolyte, or sodium bisulphate (NaHSO$_4$) in cells having an acid electrolyte.

The main body of electrolyte material may be in any suitable form such as a cast, granular, or powdered, and it may be in any portion of the cell. The auxiliary body may also be in similar forms and it may be supported in a sack or perforated container or cast around, upon, or in a suitable support.

The auxiliary water chamber may be provided by raising a portion of the cell cover or in any other way as long as it is above the normal solution level, and it may be either a part of the cell or detachable.

Various changes may be made in the structure and relative arrangement of the component parts, and equivalent materials may be substituted without departing from the range of the invention or the scope of the claims.

I claim:—

1. In an air-depolarized deferred-action cell having carbon and zinc electrodes; a cast of hydrated caustic soda around said electrodes below the normal solution level of said cell; a water chamber above the normal solution level of said cell; and a cast of caustic soda in said chamber of higher concentration than that around said electrodes.

2. In an air-depolarized deferred-action cell having carbon and zinc electrodes; a cast of caustic soda around said electrodes; a cover for said cell having a raised portion to provide a water chamber; and a separate cast of caustic soda in said chamber.

3. In an air-depolarized deferred-action cell having carbon and zinc electrodes and adapted to have an electrolyte formed therein; the combination of a cast of caustic alkali around said electrodes and below the normal level of said electrolyte; a cover for said cell having a raised portion to provide a water chamber; a closable filling opening in the top of said raised portion; a liquid level indicating wire below said opening; and a cast of caustic alkali around said wire.

4. In a water-activated deferred-action cell having electrodes; a cast of caustic soda around said electrodes; and an auxiliary water chamber above the electrolyte level of such volume that when the cell and said chamber are filled with water to activate the cell, the height of the resultant solution will be at the proper electrolyte level for the cell.

5. The invention set forth in claim 4, in which said electrodes are supported by a cell cover, and said cover is provided with a raised portion extending above the top of said electrode to provide said auxiliary water chamber.

6. A water-activated galvanic cell of the deferred-action type comprising a container adapted to contain an electrolyte solution, electrodes within said container, a main body of electrolyte-forming material in solid form below the normal solution level, a separate smaller body of electrolyte-forming material at least in part above the normal solution level, and means for sealing said container whereby access of air and moisture to said electrolyte-forming material is prevented before said cell is placed in service.

7. A deferred-action cell, adapted for being activated by the addition of water, comprising suitable electrodes in said cell, of which one is somewhat pervious to water but substantially impervious to electrolyte, and may be rendered somewhat inoperative by penetration of liquid; a cast of electrolyte-forming material around said electrodes to protect them from contact with the water of activation during the solution of said electrolyte forming material, said material being of a substance that tends to sink at the time of solution, and of which a solution occupies less space than the separate ingredients; a water chamber above the normal solution level of said electrolyte having a capacity substantially equal to the difference in volume between said material and water before and after solution of said material so that a single filling of water will produce the correct solution level in said cell; and a separate auxiliary cast of electrolyte-forming material at least partially in said chamber to increase the concentration of the upper portion of said solution at the time of activation to such an extent that it will not penetrate said pervious electrode materially.

8. An air-depolarized deferred-action cell, adapted for being activated by the addition of water, comprising suitable electrodes in said cell of which one is pervious to air and somewhat pervious to water but substantially impervious to electrolyte, and may be rendered somewhat inoperative by penetration of liquid; a cast of electrolyte-forming material around said electrodes to protect said pervious electrode from contact with the water of activation during solution of said material, which tends to form a solution having a lower concentration near the top than near the bottom, and a solution occupying less space than the separate ingredients; a water chamber at least partially above said pervious electrode and also above the solution level of said cell of such size that when said cell and said chamber are completely filled with water the surface thereof will subside to the proper operating level during solution of said material; and a separate auxiliary cast of electrolyte-forming material smaller than the main cast around the electrodes and located at least partially in said chamber to maintain a concentration of the upper portion of said solution during activation that will not materially penetrate said pervious electrode.

9. An air-polarized deferred-action cell, adapted for activation by the addition of water, comprising suitable electrodes of which one is a carbon electrode pervious to air and somewhat pervious to water, but substantially impervious to electrolyte at approximately normal concentration, that may be rendered somewhat inoperative by penetration of liquid; a cast of electrolyte-forming material surrounding said carbon electrode to protect it from contact with the water of activation during the formation of electrolyte which, at the time of formation, tends to have a lower concentration near the top than near the bottom thereof, and also occupies less space than the separate ingredients; a separate auxiliary cast of electrolyte-forming material somewhat smaller than said main cast located at least partially above the normal solution level of said cell to maintain a concentration of the upper portion of said solution during formation of electrolyte that will not materially penetrate said carbon electrode; and a water chamber for substantially the exact amount of water required above the normal solution level at the time of filling to produce the correct level of electrolyte after solution of said electrolyte forming material.

10. A battery cell of the deferred-action type, adapted for activation by a single filling of water to a point somewhat above the normal solution level, comprising an electrode somewhat pervious to electrolyte of low concentration but substantially impervious to electrolyte of approximately normal concentration, that may be rendered somewhat inoperative by penetration of liquid; an electrolyte ingredient in solid form below the normal solution level which, at the time of solution, tends to form an electrolyte having a lower concentration in the upper portion; and a separate and substantially smaller portion of said ingredient above the normal solution level to maintain the concentration of the upper portion of said electrolyte above that which will materially penetrate said electrode.

11. A battery cell of the deferred-action type, adapted for activation by a single filling of water, comprising an electrode somewhat pervious to electrolyte of very low concentration which may be rendered somewhat inoperative by liquid penetration; a main body of electrolyte ingredient in solid form in the main chamber of said cell that tends to form an electrolyte having a low concentration in the upper portion, and also an electrolyte of lower volume than that of the separate ingredients; an auxiliary chamber above the normal solution level connected with the main chamber for the water required above the normal solution level at the time of activation to effect the proper solution level of the electrolyte; and an auxiliary body of electrolyte ingredient in solid form in said auxiliary chamber to maintain the upper portion of said electrolyte during the formation thereof at a concentration that will not materially penetrate said electrode.

12. A battery cell of the deferred-action type, adapted for activation by a filling of water, comprising an electrode somewhat pervious to electrolyte of low concentration which may be rendered somewhat inoperative thereby; a cast of electrolyte ingredient below the solution level of said cell that tends to form an electrolyte having a low concentration in the upper portion; and a separate auxiliary cast of electrolyte ingredient at substantially the solution level of said cell for maintaining the upper portion of said electrolyte at a concentration that will not materially penetrate said electrode.

GEORGE W. HEISE.